March 6, 1956  H. C. KRONE ET AL  2,737,362
SPRING COUNTERBALANCED SWING JOINT
SUPPORTED CONDUIT OR LIKE ARMS Filed Jan. 12, 1955  2 Sheets-Sheet 1

INVENTORS:
Howard C. Krone & William Meyer,
BY
George D. Richards
Attorney

March 6, 1956

H. C. KRONE ET AL 2,737,362

SPRING COUNTERBALANCED SWING JOINT
SUPPORTED CONDUIT OR LIKE ARMS

Filed Jan. 12, 1955

2 Sheets-Sheet 2

INVENTORS:
Howard C. Krone & William Meyer,
BY George D. Richards,
Attorney

United States Patent Office 2,737,362
Patented Mar. 6, 1956

2,737,362

SPRING COUNTERBALANCED SWING JOINT SUPPORTED CONDUIT OR LIKE ARMS

Howard C. Krone, Short Hills, and William Meyer, East Orange, N. J., assignors to Wheaton Brass Works, Union, N. J., a corporation of New Jersey Application January 12, 1955, Serial No. 481,348

6 Claims. (Cl. 248—292)

This invention relates to improvements in spring counterbalanced swing joint supported conduit or like arms of the general type disclosed in co-pending applications for Letters Patent Serial No. 391,078 and Serial No. 459,691, filed November 9, 1953, and October 1, 1954, respectively, by applicants jointly with Richard Slawinski, being especially well adapted for use in loading conduit systems for delivering fluids from supply sources, such as for loading oil, gasoline, or other liquids into tank trucks, railroad tank cars, aeroplane storage tanks or other containers in which such liquids are transported or shipped; and the invention has reference, more particularly, to a swing joint supported loading or discharge arm adapted to be swung up and down, from either an overhead supply pipe system or a supply stand pipe, to optionally dispose the same in a raised out of service position or in a lowered service position.

The present invention has for an object to provide, in combination with a swingable discharge conduit or other arm, a compound counterbalancing spring means suitable for heavy duty use, e. g., for use in connection with a conduit or arm which is of considerable weight, and operative to return such conduit or arm to and to hold the same in its upswung out of service position, said counterbalancing spring means including buffer spring means to arrest upswinging movement of the conduit or arm served thereby, so as to bring the same to its raised out of service position without undue shock.

Figure 1:
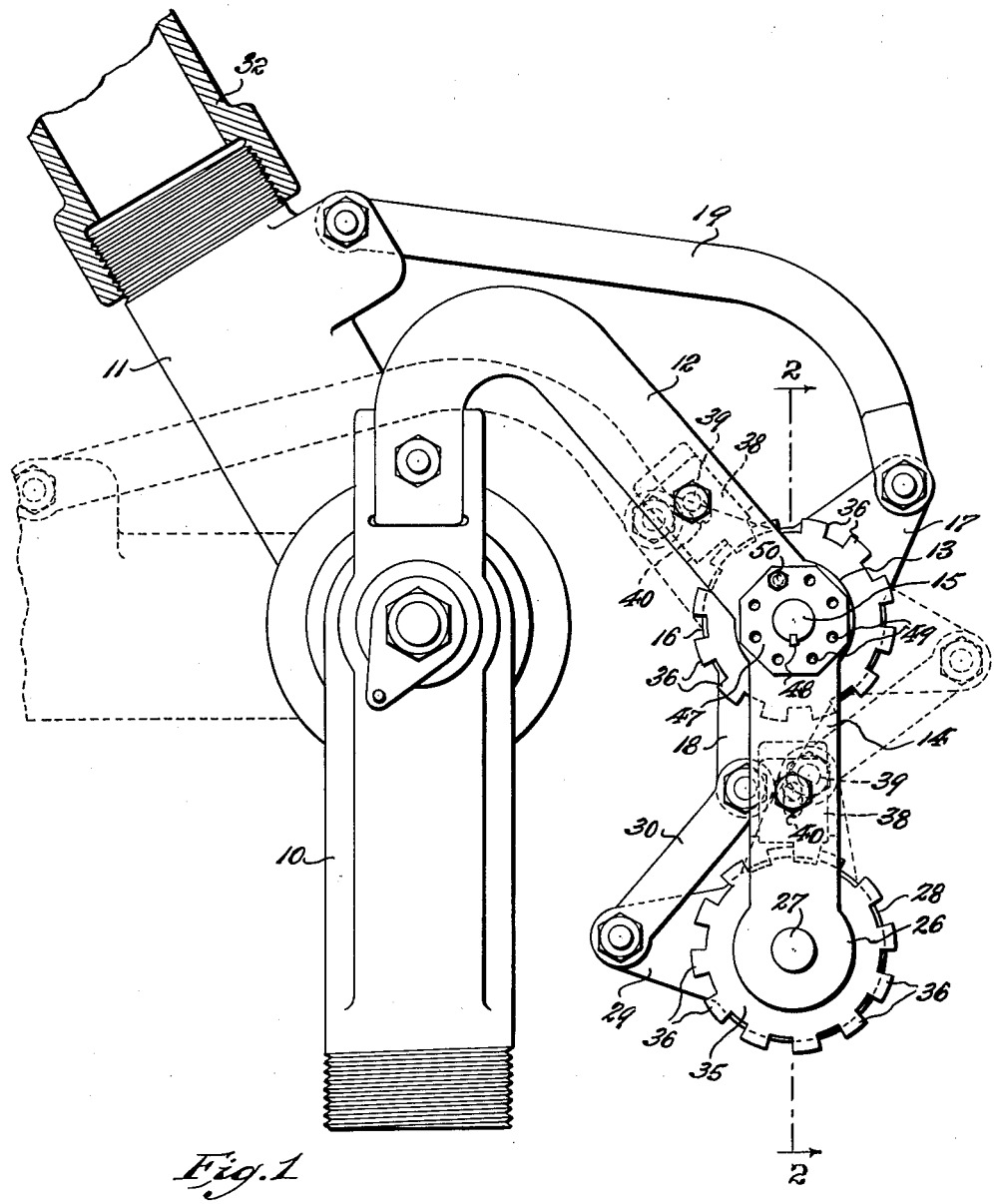
Figure 2:
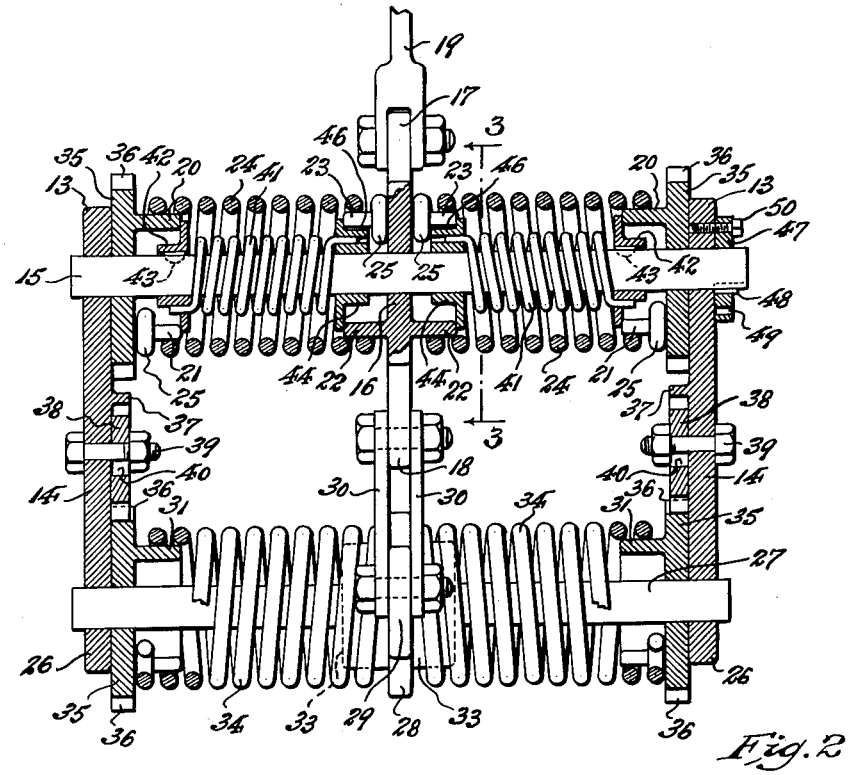
Figure 3:
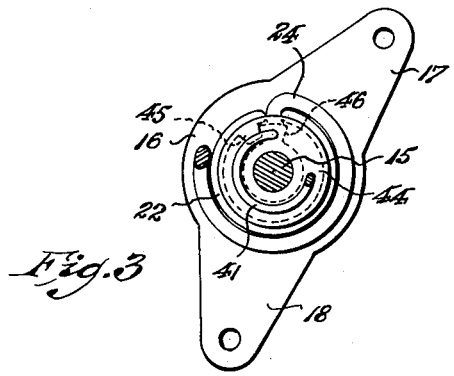

The above and other objects will be understood from a reading of the following detailed description of the present invention in connection with the accompanying drawings, in which:

Fig. 1 is a side elevational view of a swing joint by which a loading conduit or other arm is supported, and to which the compound counterbalancing spring means and associated buffer spring means of this invention is applied, the movable section of the swing joint being shown by full lines in its position for upswinging the loading conduit or other arm to a raised out of service position, and by broken lines in its position for downswinging the loading conduit or other arm to a lowered service position; Fig. 2 is a vertical sectional view, with parts in elevation, through the compound counterbalancing and buffer spring means, taken on line 2—2 in Fig. 1; and Fig. 3 is a fragmentary cross-sectional view, taken in line 3—3 in Fig. 2.

Referring to the drawings, wherein like characters of reference indicate corresponding parts, the reference character 10 indicates the stationary receiving section of a swing joint to which is pivotally connected the movable discharge section 11. The loading conduit or other arm 32 is connected to the movable discharge section 11 of the swing joint, and as so connected can be upswung to a raised out of service position, or downswung to a lowered service position.

Suitably supported in fixed connection with the stationary section 10 of the swing joint are laterally spaced apart and rearwardly projecting bracket arms 12, which terminate at their free ends 13 in downward extensions 14. Supported by said bracket arms 12, so as to extend between the free end portions 13 thereof, is a transverse shaft 15. Pivotally supported by said shaft 15 is a lever member 16 having an upwardly and somewhat rearwardly extending lever arm 17 and a downwardly and somewhat forwardly extending lever arm 18. Connected between the lever arm 17 of lever member 16 and the movable section 11 of the swing joint is a link bar 19.

Supported by the shaft 15, respectively contiguous to the inner face of the respective free end portions 13 of the bracket arms 12, are inwardly projecting hollow anchoring hub members 20, the walls of which are provided with indenting slots or openings 21. Formed in connection with the lever member 16, preferably as integral parts thereof, to respectively project from opposite faces of said lever member 16, are hollow coupling hub members 22, the walls of which are likewise provided with indenting slots or openings 23. Extending between each anchoring hub member 20 and the coupling hub member 22 opposed thereto is a convolute counterbalancing spring 24, into the respective end portions of which said respective anchoring hub members extend. Said counterbalancing springs 24 terminate at their respective ends in coupling hook elements 25 which are respectively engaged through the slots or openings 21 and 23 of the hub members 20 and 22, whereby to couple said spring ends to said respective hub members. One said counterbalancing spring is formed with left hand and the other with right hand helical turns, so that when the coupling hub members 22, to which inner ends of said springs are connected, are rotated counterclockwise by forward swinging movement of the lever arm 17 of lever member 16 under the pull of the link bar 19 (see Fig. 1), said springs will be wound to a condition of strong torsional tension which reacts in clockwise direction.

Supported by and between free end portions 26 of the extensions 14 of the bracket arms 12 is a transverse shaft 27. As thus supported said shaft 27 is disposed parallel to the shaft 15 in downwardly spaced relation thereto. Pivotally supported by said shaft 27 is a lever member 28 having a forwardly extending lever arm 29, which is connected by connecting link bars 30 with the lever arm 18 of the lever member 16, so that rotation of the latter is simultaneously transmitted to said lever member 28.

Subject to actuation by the lever member 28 is a second or auxiliary counterbalancing spring structure, which, in operation, adds its torsional tension to that of the first above described counterbalancing spring structure, so that, together with the latter, to provide a very powerful counterbalancing arrangement, which is well adapted for heavy duty service, especially for operation in connection with weighty discharge conduit or other arms, since the arrangement comprises primary and secondary spring structures coupled together in tandem for simultaneous operation.

Said secondary or auxiliary counterbalancing spring structure comprises an assembly of springs, anchoring and coupling hub members corresponding to that of the first above described or primary counterbalancing spring structure, and includes the inwardly projecting hollow anchoring hub members 31 supported on the shaft 27 respectively contiguous to the inner faces of respective free end portions 26 of the extensions 14 of the bracket arms 12. Provided in connection with the lever member 28, to project from opposite faces thereof, are hollow coupling hub members 33. Extending between each anchoring hub member 31 and a coupling hub member 33 opposed thereto is a convolute counterbalancing spring 34, the respective ends of which are attached to said respective hub members. One said counterbalancing spring 34 is formed with right hand and the other with left hand helical turns, so that when the coupling hub members 33 are rotated clockwise, by rearward swinging movement of the lever member 28, under the pull of the link bar 30 transmitted thereto by the rearward movement of the lever arm 18 of lever member 16 (see Fig. 1), said springs 34 will be wound to a condition of strong torsional tension which reacts counterclockwise in company with the clockwise torsional reaction of the springs 24 of the primary counterbalancing spring structure.

The anchoring hub members 20 and 31 of the respective counterbalancing springs 24 and 34 can be rotatably adjusted about the respective supporting shafts 15 and 27, whereby to predetermine a desired normal or relaxed tension of said counterbalancing springs, means being provided to releasably retain the anchoring hub members in positions to which they have been so adjusted. To permit such adjustment and holding of the anchoring hub members, each thereof is provided with a base flange 35 having circumferentially spaced, radial stop lugs 36 around its periphery. Slidably supported upon the inner faces of the bracket arms 12 and their extensions 14, by guide frame means 37 with which they are provided, are movable check pieces 38, which can be made fast to said bracket arms and extensions, as the case may be, by lock bolts 39 which pass through longitudinal slots 40 in the check pieces so as to screw into said bracket arms or extensions. To adjust an anchoring hub, whereby to normally tension a counterbalancing spring anchored thereby, the cooperative check piece 38 is released and retracted to disengage a stop lug 36 on the base flange 35 of the anchoring hub member. When the anchoring hub member is thus freed from the restraint of the check piece, the same can be rotated about its supporting shaft by means of a suitable tool, such as a spanner wrench engageable with a stop lug 36. Rotation of the anchoring hub member in proper direction will wind the counterbalancing spring engaged thereby to a desired normal tension, whereupon said spring can be held in such normally tensioned condition by returning the check piece into holding engagement with the selected stop lug 36 of the anchoring hub member flange 35.

Associated with one or the other or both the primary and secondary counterbalancing spring structures is buffer spring means operative to arrest upswinging movement of a discharge conduit or other arm served by the former, whereby to bring said arm to an upraised out of service position without undue shock. As shown, such buffer spring means is associated with the primary counterbalancing spring structure alone, although, as above mentioned, it may, if desired, be associated with the secondary counterbalancing spring structure alone, or it may be associated with both the primary and secondary counterbalancing spring structures if such arrangement is deemed desirable.

The buffer spring means, illustratively shown as associated with the primary counterbalancing spring structure, comprises spirally convolute springs 41 which are mounted around the shaft 15, to respectively extend within and concentric to the respective counterbalancing springs 24 between the lever member 16 and the respective anchoring hub members 20. The outer ends of the buffer springs 41 are fixedly attached to anchoring collars 42 which are mounted on the shaft 15, inwardly of the anchoring hub members 20, and which are secured to the shaft, in non-rotatable relation thereto, as by keys 43 or other suitable fastening means. Means is provided for coupling the inner ends of the buffer springs 41 with the coupling hub members 22 of the lever member 16 by a lost motion connection, in substantially the same manner and for the same purpose as disclosed in our co-pending application for Letters Patent Serial No. 459,691. To such end, coupling collars 44 are rotatably mounted on the shaft 15 respectively within the respective coupling hub members 22 of the lever member 16. The interior of each coupling hub member 22 is provided with an inwardly projecting radial clutch tongue 45, and the associated coupling collar 44 is provided with an outwardly projecting radial clutch tongue 46, that is adapted to engage said clutch tongue 45, whereby, at proper times, to impart rotative thrust against the lever member 16 in counterclockwise direction in opposition to the clockwise thrust of relaxing torsional tension of the counterbalancing springs 24. To assure such functioning of the buffer springs 41, the helical turns thereof are of direction opposite to the direction of the helical turns of the counterbalancing springs within which they are disposed.

Means is provided for regulating the effective buffer or shock cushioning tension of the buffer springs 41, the same comprising a knob plate 47 which is affixed by a key 48, or other suitable fastening means, to an external end of the shaft 15, so as to be disposed contiguous to the outer face of the ends 13 of the bracket arms 12. Said knob plate 47 is provided with a plurality of circumferentially spaced openings 49, through a selected one of which is passed lock screw 50 to screw into the bracket arm end 13, thus holding the knob plate 47, the shaft 15 and anchoring collars 42 against rotation. Since the anchoring collars 42 are keyed to the shaft 15 so as to turn therewith, to regulate the effective buffer or shock cushioning tension of the buffer springs, it is merely necessary to remove the lock screw 50 and then turn the knob plate 47 so as to rotate the shaft 15 and anchoring collars 42, whereby to wind the said buffer springs to desired tension. This is done while the movable section 11 of the swing joint, and the discharge conduit or other arm carried thereby, occupies upswung position, and while the clutch tongues 46 of the coupling collars 42 are engaged with the clutch tongues 45 of the coupling hub members 22 of the lever member 16. Desired operative tension of the buffer springs 41 having been established, the lock screw 50 is passed through an appropriate opening 49 and screwed home in the bracket arm end 13 to secure the knob plate 47 in adjusted position, whereby to hold the shaft 15 and the anchoring collars 42 stationary.

In operation, when a discharge conduit or other arm carried by the movable section 11 of the swing joint is downswung to a lowered service position, such movement thereof is transmitted through the link bar 19 to the lever member 16, whereby the latter is rotated counterclockwise (as viewed in Fig. 1). Such rotation of the lever member 16 is simultaneously transmitted, through the lever arm 18, connecting link rods 30 and lever arm 29 to the lever member 28, thus rotating the latter in clockwise direction. By such rotative movements of the lever members 16 and 28, the counterbalancing springs 24 and 32 are wound to a condition of stored strong torsional tension. As the lever member 16 is thus moved in counterclockwise direction, the clutch tongues 45 of the coupling hub members 22 are carried away from and lose contact with the clutch tongues 46 of the buffer spring coupling collars 44, thus permitting the buffer springs 41 to unwind until totally relaxed, so that the latter offer no impedance to continued downswinging movement to final lowered position of the movable section of the swing joint and the discharge conduit or other arm carried thereby, and the counterbalancing springs 24 and 34 are wound to full torsional tension. After use, when the discharge conduit or other arm is released for return to upraised out of service position, the stored tension of the counterbalancing springs 24 and 34 will power the return movement thereof to raised normal out of service position. As the thus upswung discharge conduit or other arm approaches raised normal out service position, the clockwise rotation of the lever member 16 and coupling hub members 22 will carry the clutch tongues 45 of the latter into engagement with the clutch tongues 46 of the buffer spring coupling collars 44. When the clutch tongues 45 and 46 thus reengage, and during completion of the return movement of the discharge conduit or other arm to the raised out of service position thereof, the buffer spring coupling collar 44 will be rotated in direction to wind the buffer springs to increasing torsional tension, thereby opposing the reaction of the counterbalancing springs 24 and 34, so that the approach of the discharge conduit or other arm to fully raised out of service position is increasingly resisted, and said arm is finally brought to rest in out of service position without shock.

Although as shown in the drawings and above described, the primary and secondary counterbalancing spring structures are respectively of the dual spring type, similar to that disclosed in our co-pending application Serial No. 391,078, it will be understood that the same may be of single spring type, similar to that disclosed in our copending application Ser. No. 459,691, if so desired.

Having now described our invention, we claim:

1. In combination with a swing joint supported arm, means to counterbalance said arm for normal disposition in raised position comprising a plurality of counterbalancing spring structures, each said structure comprising a pivot shaft, a lever member pivotally mounted on said shaft, a counterbalancing torsional spring having means to anchor one end thereof and means to couple the opposite end thereof to said lever member; said spring being operative to bias the lever member for transmission of swinging movement of the swing joint supported arm from a lowered position to a raised position, means to support the shafts of said structures in offset parallel relation to the axis of the swing joint supported arm and in spaced apart relation one to another, a link bar connecting the lever member of one said structure with the swing joint supported arm, a connecting link coupling the lever members of said structures one to another, and at least one of said structures including a torsional buffer spring having means to anchor one end thereof and means to couple the opposite end thereof to the lever member of said structure, whereby to bias said lever member in resistance to swinging movement of the swing joint supported arm to raised position, thereby to cushion the latter against shock as it returns from a lowered position to said raised position.

2. The combination defined by claim 1 wherein the means to anchor the counterbalancing torsional spring of each counterbalancing spring structure, subject to the torque of the lever member to which it is coupled, includes means to adjust the same for predetermining normal initial tension of said torsional spring.

3. The combination defined by claim 2, wherein the means to anchor the buffer spring subject to torque of the lever member to which it is coupled includes means to adjust the same for regulating the tension of said buffer spring means.

4. In combination with a swing joint supported arm wherein the supporting swing joint includes a stationary section, means to counterbalance said arm for normal disposition in raised position comprising a pair of counterbalancing spring structures, each said structure comprising a pivot shaft, a lever member pivotally mounted on said shaft, a counterbalancing helical spring concentric to said shaft and coupled by an end to said lever member, a stationary anchor to which an opposite end of the helical spring is attached, laterally spaced bracket arms affixed to the stationary section of the swing joint for rearward extension therefrom, the shafts of said counterbalancing spring structures being supported by and between said bracket arms in spaced apart parallel relation and in rearwardly offset parallel relation to the axis of the swing joint supported arm, a link bar connecting the lever member of one counterbalancing spring structure with the swing joint supported arm, a link connecting said last mentioned lever member with the lever member of the other counterbalancing spring structure, and at least one of said spring structures including a helical buffer spring concentric to its shaft, an anchor fixed on said shaft to which an end of the helical buffer spring is attached, and a lost motion connection to couple an opposite end of said helical buffer spring to the lever member of said last mentioned spring structure.

5. The combination according to claim 4, further including respective means to adjust the anchors of the helical springs of the respective counterbalancing spring structures, whereby to predetermine normal initial tension thereof.

6. The combination according to claim 5, which further includes means to adjust the anchor of the buffer spring whereby to regulate the tension thereof.

References Cited in the file of this patent

UNITED STATES PATENTS

| | | |
|---|---|---|
| 884,105 | Ryerson et al. | Apr. 7, 1908 |
| 2,200,518 | Perbal | May 14, 1940 |
| 2,299,251 | Perbal | Oct. 20, 1942 |

FOREIGN PATENTS

| | | |
|---|---|---|
| 772,052 | France | of 1934 |